United States Patent
Lucht et al.

(10) Patent No.: US 11,673,449 B2
(45) Date of Patent: Jun. 13, 2023

(54) METHOD AND SYSTEM FOR CONTROL OF A HYBRID POWER SYSTEM FOR POWERING A TRANSPORT CLIMATE CONTROL SYSTEM

(71) Applicant: THERMO KING LLC, Minneapolis, MN (US)

(72) Inventors: Erich A. Lucht, Arden Hills, MN (US); Ross T. Nelson, Minneapolis, MN (US); John G. Simpson, South St Paul, MN (US)

(73) Assignee: THERMO KING LLC, Minneapolis, MN (US)

( * ) Notice: Subject to any disclaimer, the term of this patent is extended or adjusted under 35 U.S.C. 154(b) by 14 days.

(21) Appl. No.: 17/138,104

(22) Filed: Dec. 30, 2020

(65) Prior Publication Data
US 2022/0203802 A1 Jun. 30, 2022

(51) Int. Cl.
*B60H 1/00* (2006.01)

(52) U.S. Cl.
CPC ..... *B60H 1/00428* (2013.01); *B60H 1/00014* (2013.01); *B60H 1/00264* (2013.01); *B60H 1/00378* (2013.01); *B60H 1/00642* (2013.01); *F25B 2600/0253* (2013.01)

(58) Field of Classification Search
CPC ............... F25B 2600/0253; B60P 3/20; B60H 1/00428; B60H 1/00014; B60H 1/00264; B60H 1/00378; B60H 1/00642
See application file for complete search history.

(56) References Cited

U.S. PATENT DOCUMENTS

| 2004/0199297 A1 | 10/2004 | Schaper et al. |
| 2012/0101671 A1 | 4/2012 | Caouette |

(Continued)

FOREIGN PATENT DOCUMENTS

| DE | 102016122651 | 6/2017 |
| EP | 3282537 | 2/2018 |

(Continued)

OTHER PUBLICATIONS

Extended European Search Report, issued in the corresponding European patent application No. 21215080.9, dated Jun. 10, 2022, 10 pages.

*Primary Examiner* — Jonathan Bradford
(74) *Attorney, Agent, or Firm* — Hamre, Schumann, Mueller & Larson, P.C.

(57) ABSTRACT

A method for controlling a power system that powers a load is provided. The power system includes a prime mover, an electrical machine coupled to the prime mover, a battery source, an inverter coupled to the battery source, and a power system controller configured to control operation of the power system. The method includes monitoring a power demand on the power system from the load. The method also includes comparing the monitored power demand with a load threshold value. Also, the method includes determining that the monitored power demand is less than the load threshold value. Further, the method includes upon determining that the monitored power demand is less than the load threshold value: inactivating the prime mover, and instructing the battery source with the inverter to supply power to the load.

20 Claims, 8 Drawing Sheets

(56) References Cited

U.S. PATENT DOCUMENTS

| | | | |
|---|---|---|---|
| 2013/0289847 A1* | 10/2013 | Olaleye | F02D 41/28 |
| | | | 701/102 |
| 2014/0026599 A1* | 1/2014 | Rusignuolo | F25B 49/025 |
| | | | 62/243 |
| 2017/0151876 A1 | 6/2017 | Kinoshita | |
| 2018/0065489 A1 | 3/2018 | Zhou et al. | |
| 2018/0273018 A1* | 9/2018 | Follen | B60W 20/12 |

FOREIGN PATENT DOCUMENTS

| | | |
|---|---|---|
| EP | 3626489 | 3/2020 |
| EP | 3626490 | 3/2020 |

* cited by examiner

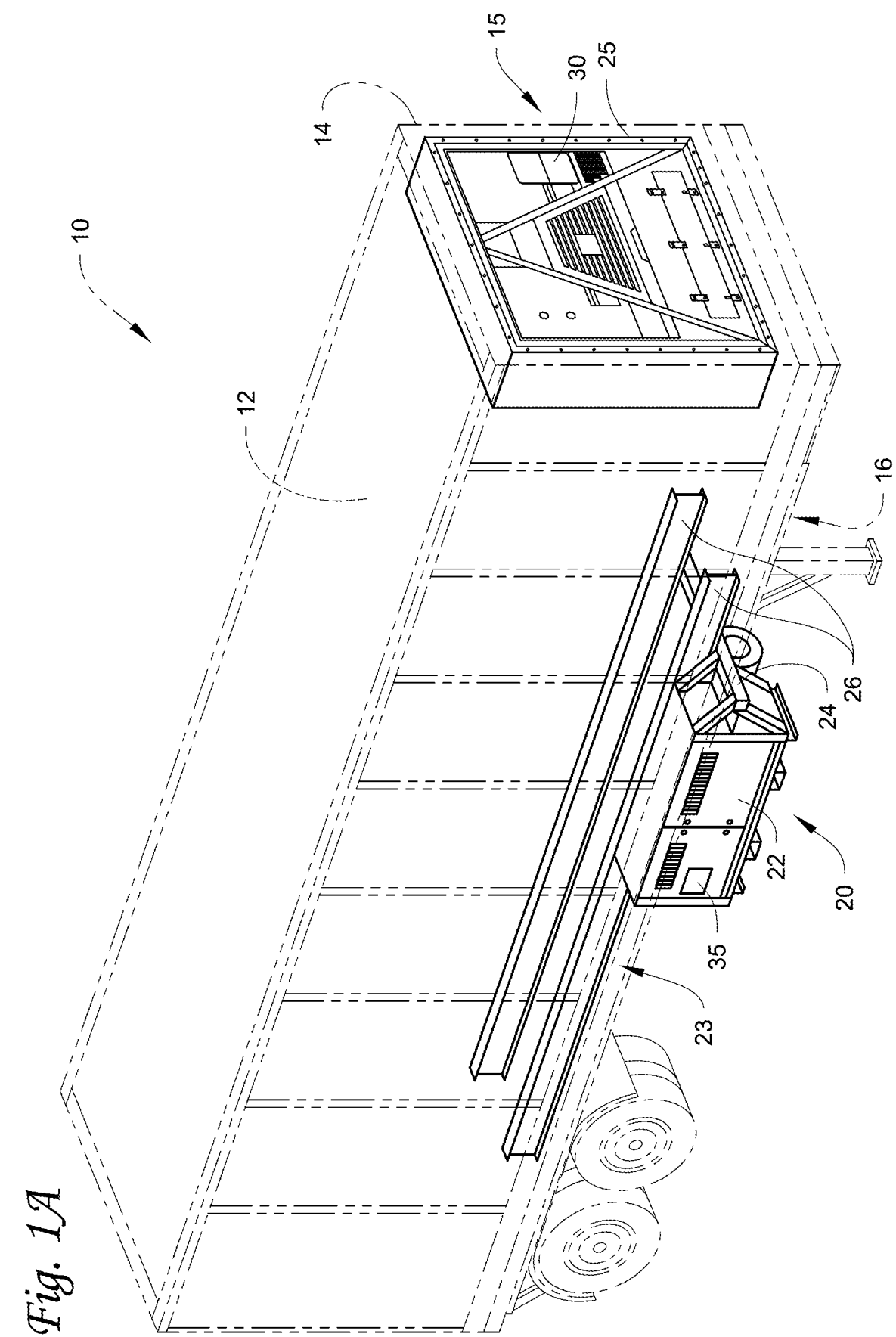

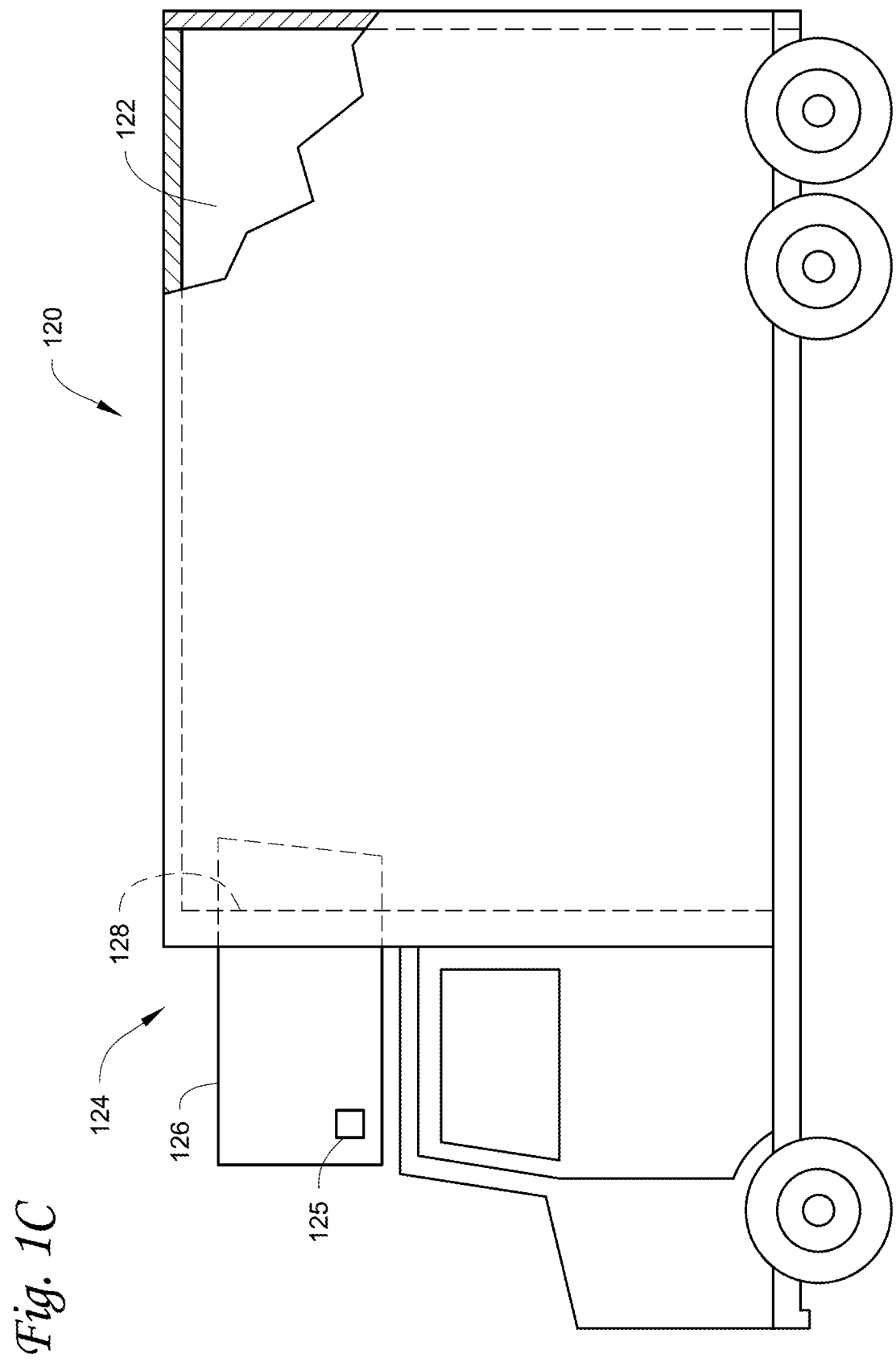

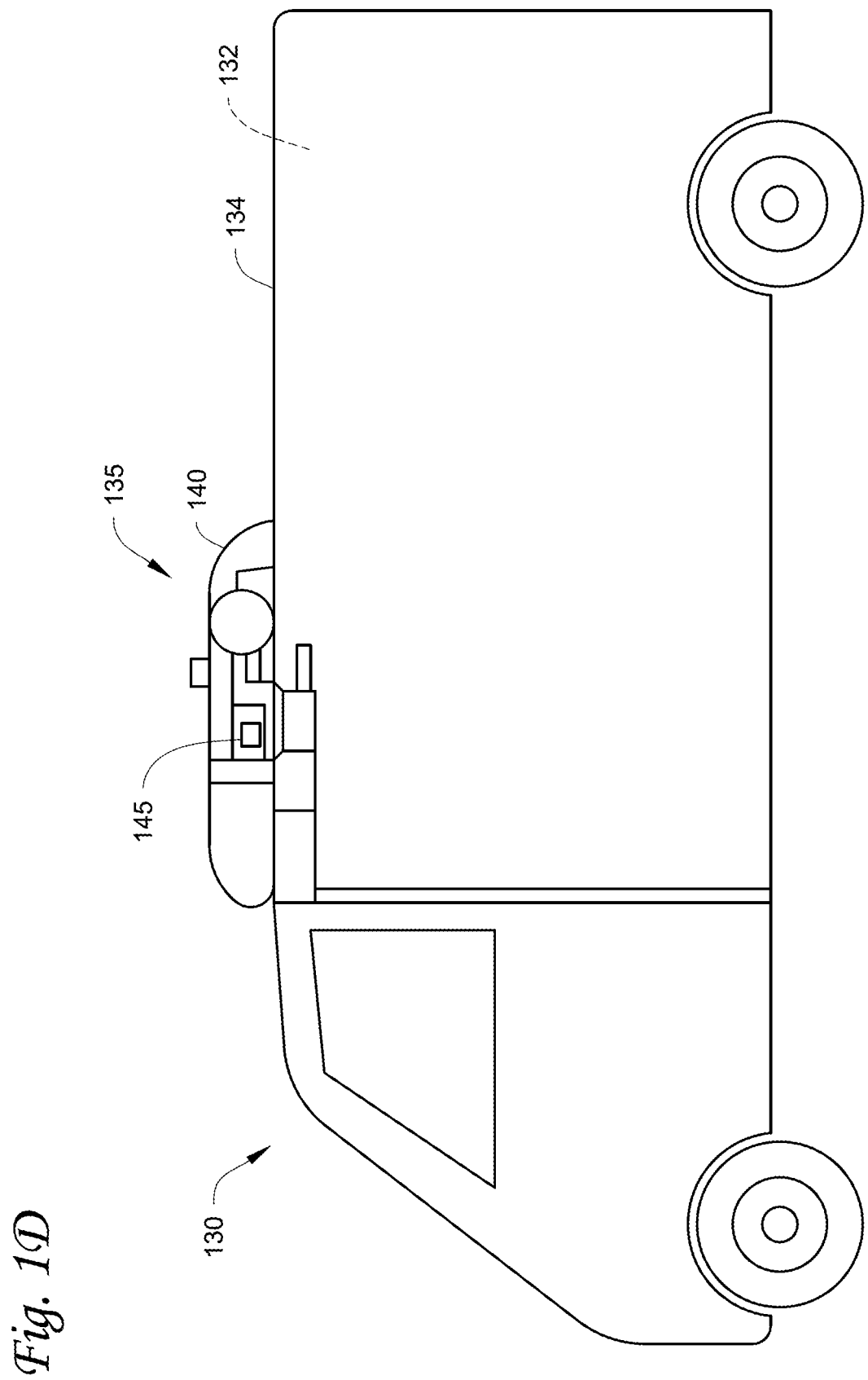

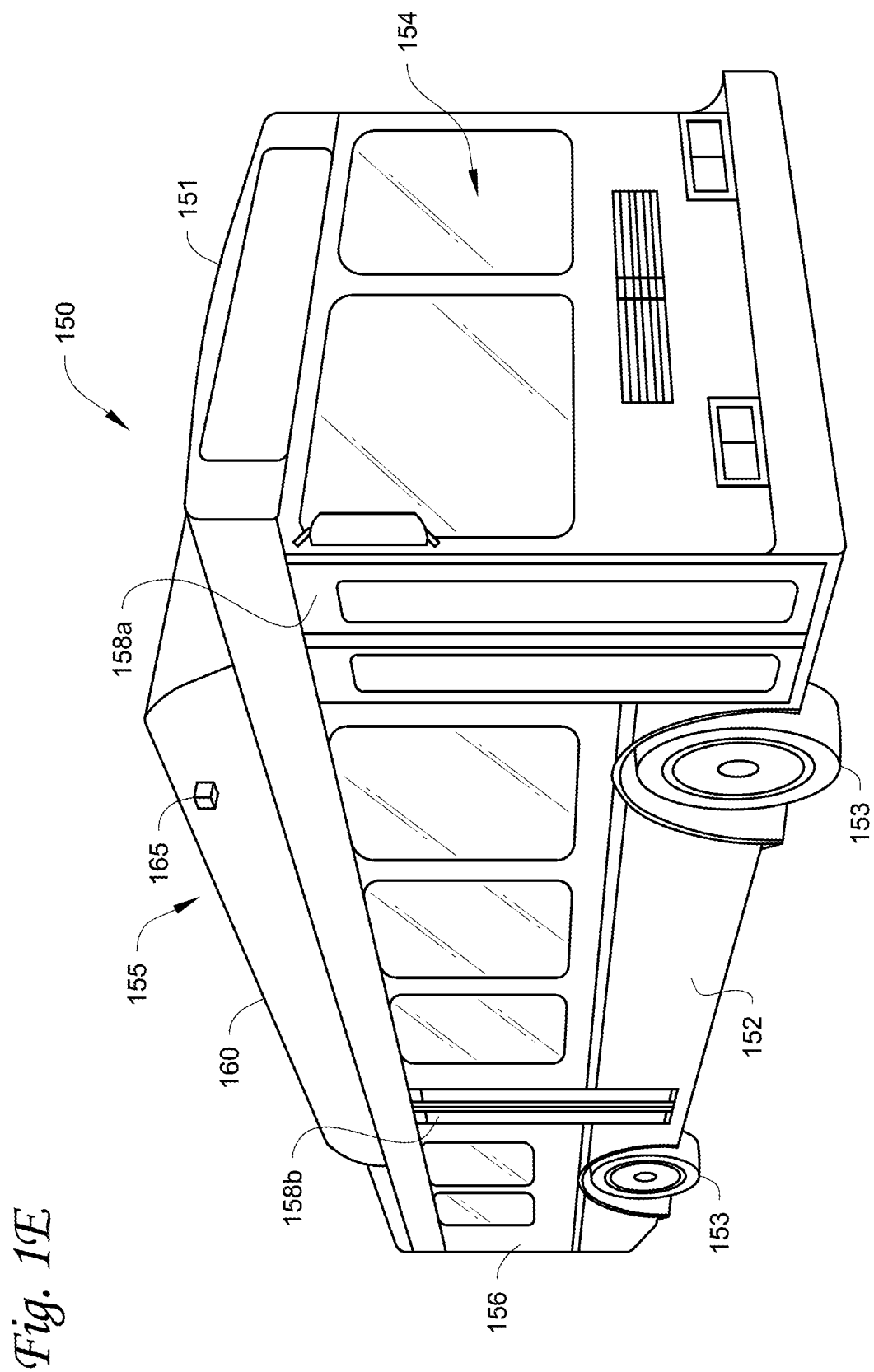

METHOD AND SYSTEM FOR CONTROL OF A HYBRID POWER SYSTEM FOR POWERING A TRANSPORT CLIMATE CONTROL SYSTEM

FIELD

This disclosure relates generally to a power system used to power, for example, a transport climate control system. More specifically, this disclosure relates to a method and system for control of a power system.

BACKGROUND

A power system, such as a generator set (also referred to herein as a "genset"), can be used to power a transport climate control system, stationary equipment (such as a construction lift), etc. A genset is a portable source of energy that can be used to provide power when a utility power source (e.g., power grid, shore power, etc.) is not available such as, for example, during transport.

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

This disclosure relates generally to a power system used to power, for example, a transport climate control system. More specifically, this disclosure relates to a method and system for control of a power system.

The embodiments described herein allow a prime mover (e.g., diesel engine) of a power system (e.g., genset) to become inactive (e.g., shut off, power off, turn off, etc.) during a low demand operation cycle of equipment being powered by the power system. A battery source of the power system can provide the necessary power demand during the low demand operation cycle. During a high demand operation cycle of the equipment being powered by the power system, the prime mover can be turned on to provide the necessary power demand.

Accordingly, the embodiments described herein can avoid running of the prime mover when there is a low load demand. This can prevent rapid formation of exhaust deposits on, for example, injector tips, exhaust piping, an exhaust gas recirculation (EGR) cooler, an EGR valve, EGR piping, an exhaust manifold, a diesel oxidation catalyst (DOC), exhaust gas sensors, and other related components of the power system that can occur when the prime mover is running and there is low load demand. These deposit formations can degrade prime mover performance and efficiency and can increase the frequency of maintenance intervals.

In some embodiments, the prime mover can also charge the battery source during the high demand operation cycle. Accordingly, the embodiments described herein can also promote a higher load demand on the prime mover when the prime mover is running by supplementing with battery charging.

In one example, a generator set with a prime mover (e.g., diesel engine) and an electrical machine (e.g., three phase AC generator) is used to power a transport climate control system. In some embodiments, the transport climate control system can operate in a start-stop cooling mode in which a transport climate control system controller of the transport climate control system is configured to instruct the compressor to operate in a periodic cycle. During each periodic cycle, the compressor is configured to compress the working fluid for a first period of time (a start portion) and then the compressor is configured to stop compressing the working fluid for a second period of time (a stop portion). The compressor will continue to cycle between compressing the working fluid and not compressing the working fluid until the temperature within the climate controlled space reaches the desired setpoint temperature. When the transport climate control system is operating in the stop portion (e.g., the compressor is configured to stop compressing the working fluid), the power demanded by the transport climate control system can be low. In order to prevent the detrimental effects of operating the prime mover when there is a low demand (e.g., low EGT which can promote rapid formation of exhaust deposits on injector tips, exhaust piping, EGR cooler, EGR valve, EGR piping, exhaust manifold, DOC, exhaust gas sensors, and other related parts), the generator set can inactivate (e.g., shut off, power off, turn off, etc.) the prime mover and use a battery source and an inverter of the generator set to supply power (e.g., three phase AC power) to the transport climate control system. When the transport climate control system is operating in the start portion (e.g., the compressor is configured to compress the working fluid), the generator set can use the prime mover and the electrical machine to supply power (e.g., three phase AC power) to the transport climate control system (including the compressor). Also, during the start portion the prime mover and the electrical machine can supply power to charge the battery source to allow the prime mover to operate at peak torque and therefore operate more efficiently.

It will be appreciated that the period of time that the transport climate control system is operating in the stop portion can be significantly longer that the period of time that the transport climate control system is operating in the start portion, particularly when the transport climate control system is working to provide a frozen temperature range (e.g., well below 32° F. such as, for example, between approximately −10° F. to −40° F.) within the climate controlled space. By supplying power to the transport climate control system via the battery source instead of the prime mover during the stop portion, the detrimental effects of low EGT can be significantly reduced.

In one embodiment, a method for controlling a power system that powers a load is provided. The power system includes a prime mover, an electrical machine coupled to the prime mover, a battery source, an inverter coupled to the battery source, and a power system controller configured to control operation of the power system. The method includes monitoring a power demand on the power system from the load. The method also includes comparing the monitored power demand with a load threshold value. Also, the method includes determining that the monitored power demand is less than the load threshold value. Further, the method includes upon determining that the monitored power demand is less than the load threshold value: inactivating the prime mover, and instructing the battery source with the inverter to supply power to the load.

In another embodiment, a power system for supplying power to a load is provided. The power system includes a prime mover, an electrical machine, a battery source, an inverter and a power system controller. The prime mover is configured to generate mechanical power. The electrical machine is coupled to the prime mover. Also, the electrical machine is configured to convert the mechanical power from the prime mover into a first electrical power for powering the load. The battery source is configured to supply a second electrical power to the inverter. The inverter is coupled to the battery source. Also, the inverter is configured to convert the second electrical power from the battery source into the first electrical power that is supplied to the load. The power system controller is configured to control operation of the power system. The power system controller is configured to: monitor a power demand on the power system from the load, compare the monitored power demand with a load threshold value, determine whether the monitored power demand is less than the load threshold value. Upon determination that the monitored power demand is less than the load threshold value, the power system controller is configured to inactivate (e.g., shut off, power off, turn off, etc.) the prime mover, and instruct the battery source with the inverter to supply the first electrical power to the load.

BRIEF DESCRIPTION OF THE DRAWINGS

References are made to the accompanying drawings that form a part of this disclosure, and which illustrate embodiments in which the systems and methods described in this Specification can be practiced.

FIG. 1A illustrates a perspective view of a container that includes a transport climate control system, according to one embodiment.

FIG. 1C is a side view of a truck with a transport climate control system, according to one embodiment.

FIG. 1D is a side view of a van with a transport climate control system, according to one embodiment.

FIG. 1E is a perspective view of a passenger vehicle including a climate control system, according to one embodiment.

Like reference numbers represent like parts throughout.

DETAILED DESCRIPTION

Figure 1B:
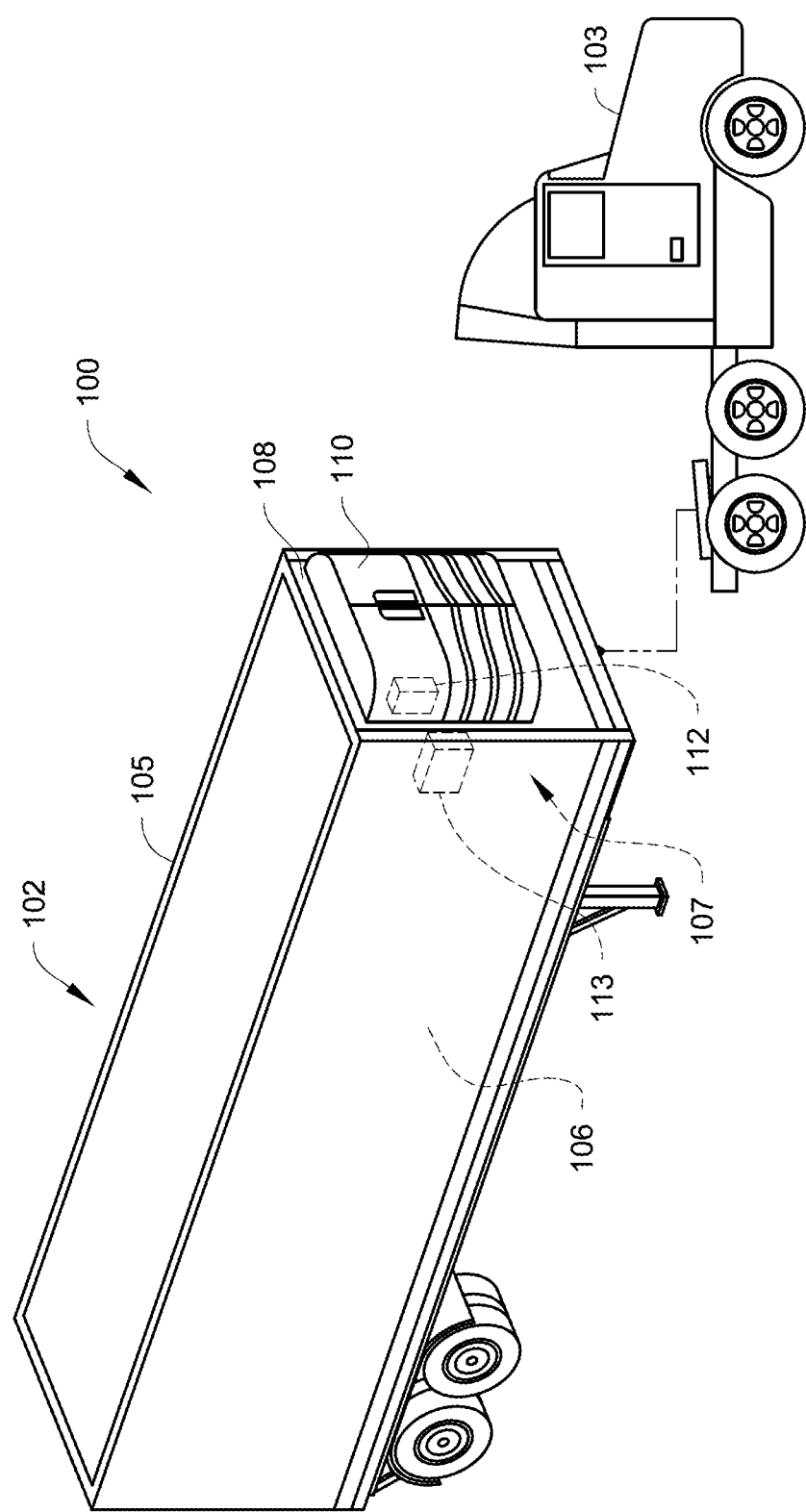
FIG. 1B is a perspective view of a refrigerated transport unit attached to a tractor, according to one embodiment.

This disclosure relates generally to a power system used to power, for example, a transport climate control system. More specifically, this disclosure relates to a method and system for control of a power system.

The power system, as described herein can be a generator set. A generator set ("genset") generally includes the combination of a prime mover (e.g., an engine such as a diesel engine) with an electrical machine (e.g., a generator) that can be used to generate electrical power. As described in more detail below, a generator set can also include the combination of a battery source and an inverter that can also be used to generate electrical power. A genset can be used to power equipment when a utility power source is unavailable.

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, a rail container, etc.), a box car, a semi-tractor, a passenger vehicle, or other similar transport unit. A climate controlled transport unit can be used to transport perishable items such as pharmaceuticals, produce, frozen foods, and meat products and/or can be used to provide climate comfort for passengers in a passenger space of a passenger vehicle.

A climate control system is generally used to control one or more environmental conditions such as, but not limited to, temperature, humidity, and/or air quality of a transport unit. In some embodiments, a climate control system includes, for example, a refrigeration system for controlling the refrigeration of a climate controlled space of a climate controlled transport unit. The climate control system may include a vapor-compressor type climate controlled system, a thermal accumulator type system, or any other suitable climate controlled system that can use a working fluid (e.g., refrigerant, etc.), cold plate technology, or the like. In some embodiments, a climate control system includes, for example, a HVAC system for controlling the climate within a passenger space of a climate controlled transport unit. The climate control system may include a vapor-compressor type HVAC system, a thermal accumulator type system, or any other suitable HVAC system that can use a working fluid (e.g., refrigerant, etc.), cold plate technology, or the like.

A climate control system can include a climate control unit (CCU) attached to a transport unit to control one or more environmental conditions (e.g., temperature, humidity, air quality, etc.) of a climate controlled space of the refrigerated transport unit. The CCU can include, without limitation, a compressor, a condenser, an expansion valve, an evaporator, and one or more fans or blowers to control the heat exchange between the air within the climate controlled space and the ambient air outside of the refrigerated transport unit.

FIGS. 1A-1E show various transport climate control systems. It will be appreciated that the embodiments described herein are not limited to the examples provided below, but can apply to any type of transport unit (e.g., a truck, a container (such as a container on a flat car, an intermodal container, a marine container, etc.), a box car, a semi-tractor, a passenger bus, or other similar transport unit), etc.

FIG. 1A illustrates one embodiment of an intermodal container 10 with a transport climate control system 15 and a power system 20. The intermodal container 10 can be used across different modes of transport including, for example, ship, rail, tractor-trailer, etc.

The transport climate control system 15 includes a climate control unit (CCU) 25 that provides environmental control (e.g. temperature, humidity, air quality, etc.) within a climate controlled space 12 of the intermodal container 10. The climate control system 15 also includes a programmable climate controller 30 and one or more sensors (not shown) that are configured to measure one or more parameters of the climate control system 15 (e.g., an ambient temperature outside of the intermodal container 10, a space temperature within the climate controlled space 12, an ambient humidity outside of the intermodal container 10, a space humidity within the climate controlled space 12, etc.) and communicate parameter data to the climate controller 30.

When operating in a continuous cooling mode and/or a start-stop cooling mode, the transport climate control system 15 can operate in a pulldown setting and in a steady-state setting. The pulldown setting generally occurs when, for example, the climate controlled space 12 is being cooled from an ambient temperature down to a desired set-point temperature so that the transport climate control system 15 can bring the temperature down to the desired set-point temperature as quickly as possible. The steady-state setting generally occurs when, for example, the climate in the climate controlled space 12 has already reached or is close to approaching a desired set-point temperature and the transport climate control system 15 is working to maintain the desired set-point temperature.

The CCU 25 is disposed on a front wall 14 of the intermodal container 10. In other embodiments, it will be appreciated that the CCU 25 can be disposed, for example, on a rooftop or another wall of the intermodal container 10. The CCU 25 includes a transport climate control circuit (not shown) that connects, for example, a compressor, a condenser, an evaporator and an expander (e.g., expansion valve) to provide conditioned air within the climate controlled space 12.

The climate controller 30 may comprise a single integrated control unit or may comprise a distributed network of climate controller elements (not shown). The number of distributed control elements in a given network can depend upon the particular application of the principles described herein. The climate controller 30 is configured to control operation of the climate control system 15 including the transport climate control circuit.

The climate control system 15 is powered by the power system 20 that can distribute power to the climate control system 15 when a utility power source is unavailable. In this embodiment, the power system 20 is a generator set disposed on a bottom wall 16 of the intermodal container 10 and electrically connected to one or more components of the climate control system 15 (e.g., a compressor, one or more fans and/or blowers, the climate controller 30, one or more sensors, etc.).

In this embodiment, the power system 20 includes a housing 22 attached to a frame 23 by a mounting assembly 24. The mounting assembly 24 can extend between the housing 22 and cross members 26 that are part of the frame 23. The mounting assembly 24 can be made of a high-strength material (e.g., steel, etc.) to rigidly attach the power system 20 to the intermodal container 10. The power system 20 includes a power system controller 35 that is configured to control operation of the power system 20. Operation of a power system, such as the power system 20, is discussed in further detail below with respect to FIGS. 2 and 3.

FIG. 1B illustrates one embodiment of a climate controlled transport unit 102 attached to a tractor 103. The climate controlled transport unit 102 includes a climate control system 100 for a transport unit 105. The tractor 103 is attached to and is configured to tow the transport unit 105. The transport unit 105 shown in FIG. 1B is a trailer.

The transport climate control system 100 includes a climate control unit (CCU) 110 that provides environmental control (e.g. temperature, humidity, air quality, etc.) within a climate controlled space 106 of the transport unit 105. The climate control system 100 also includes a programmable climate controller 107 and one or more sensors (not shown) that are configured to measure one or more parameters of the climate control system 100 (e.g., an ambient temperature outside of the transport unit 105, a space temperature within the climate controlled space 106, an ambient humidity outside of the transport unit 105, a space humidity within the climate controlled space 106, etc.) and communicate parameter data to the climate controller 107.

The transport climate control system 100 can operate in multiple operation modes including, for example, a continuous cooling mode, a start/stop cooling mode, a heating mode, a defrost mode, a null mode, etc. When operating in a continuous cooling mode and/or a start-stop cooling mode, the transport climate control system 100 can operate in a pulldown setting and in a steady-state setting. The pulldown setting generally occurs when, for example, the climate controlled space 106 is being cooled from an ambient temperature down to a desired set-point temperature so that the transport climate control system 100 can bring the temperature down to the desired set-point temperature as quickly as possible. The steady-state setting generally occurs when, for example, the climate in the climate controlled space 106 has already reached or is close to approaching a desired set-point temperature and the transport climate control system 100 is working to maintain the desired set-point temperature.

The CCU 110 is disposed on a front wall 108 of the transport unit 105. In other embodiments, it will be appreciated that the CCU 110 can be disposed, for example, on a rooftop or another wall of the transport unit 105. The CCU 110 includes a transport climate control circuit (not shown) that connects, for example, a compressor, a condenser, an evaporator and an expander (e.g., expansion valve) to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the climate control system 100 including the transport climate control circuit.

The climate control system 100 is powered by a power system (see, for example, FIG. 2) that can distribute power to the climate control system 100 when a utility power source is unavailable. In some embodiments, the power system can be a generator set (not shown) attached to the transport unit 105 and electrically connected to one or more components of the climate control system 100 (e.g., a compressor, one or more fans and/or blowers, the climate controller 107, one or more sensors, etc.). Operation of a power system is discussed in further detail below with respect to FIGS. 2 and 3.

FIG. 1C is a side view of a truck 120 with a transport climate control system 124, according to an embodiment. The truck 120 includes a climate controlled space 122 for carrying cargo. The transport climate control system 124 includes a CCU 126 that is mounted to a front wall 128 of the climate controlled space 122. The CCU 126 can include, among other components, a climate control circuit (not shown) that connects, for example, a compressor, a condenser, an evaporator, and an expander (e.g., expansion valve) to provide climate control within the climate controlled space 122. In an embodiment, the CCU 126 can be a transport refrigeration unit.

The transport climate control system 124 also includes a programmable climate controller 125 and one or more climate control sensors (not shown) that are configured to measure one or more parameters of the transport climate control system 124 (e.g., an ambient temperature outside of the truck 120, an ambient humidity outside of the truck 120, a compressor suction pressure, a compressor discharge pressure, a supply air temperature of air supplied by the CCU 126 into the climate controlled space 122, a return air temperature of air returned from the climate controlled space 122 back to the CCU 126, a humidity within the climate controlled space 122, etc.) and communicate climate control data to the climate controller 125. The one or more climate control sensors can be positioned at various locations outside the truck 120 and/or inside the truck 120 (including within the climate controlled space 122).

The transport climate control system 124 can operate in multiple operation modes including, for example, a continuous cooling mode, a start/stop cooling mode, a heating mode, a defrost mode, a null mode, etc. When operating in a continuous cooling mode and/or a start-stop cooling mode, the transport climate control system 124 can operate in a pulldown setting and in a steady-state setting. The pulldown setting generally occurs when, for example, the climate controlled space 122 is being cooled from an ambient temperature down to a desired set-point temperature so that the transport climate control system 124 can bring the temperature down to the desired set-point temperature as quickly as possible. The steady-state setting generally occurs when, for example, the climate in the climate controlled space 122 has already reached or is close to approaching a desired set-point temperature and the transport climate control system 124 is working to maintain the desired set-point temperature.

The climate controller 125 is configured to control operation of the transport climate control system 124 including components of the climate control circuit. The climate controller 125 may include a single integrated control unit or may include a distributed network of climate controller elements (not shown). The number of distributed control elements in a given network can depend upon the particular application of the principles described herein. The measured parameters obtained by the one or more climate control sensors can be used by the climate controller 125 to control operation of the climate control system 124.

The climate control system 124 is powered by a power system (see, for example, FIG. 2) that can distribute power to the climate control system 124 when a utility power source is unavailable. In some embodiments, the power system can be a generator set (not shown) attached to the truck 120 and electrically connected to one or more components of the climate control system 124 (e.g., a compressor, one or more fans and/or blowers, the climate controller 125, one or more sensors, etc.). Operation of a power system is discussed in further detail below with respect to FIGS. 2 and 3.

FIG. 1D depicts a side view of a van 130 with a transport climate control system 135 for providing climate control within a climate controlled space 132, according to one embodiment. The transport climate control system 135 includes a climate control unit (CCU) 140 that is mounted to a rooftop 134 of the van 130. In an embodiment, the CCU 140 can be a transport refrigeration unit. The climate control system 135 also includes a programmable climate controller 145 and one or more sensors (not shown) that are configured to measure one or more parameters of the climate control system 135 (e.g., an ambient temperature outside of the van 130, a space temperature within the climate controlled space 132, an ambient humidity outside of the van 130, a space humidity within the climate controlled space 132, etc.) and communicate parameter data to the climate controller 145.

The transport climate control system 135 can include, among other components, a transport climate control circuit (not shown) that connects, for example, a compressor, a condenser, an evaporator, and an expander (e.g., an expansion valve) to provide climate control within the climate controlled space 132.

The transport climate control system 135 can operate in multiple operation modes including, for example, a continuous cooling mode, a start/stop cooling mode, a heating mode, a defrost mode, a null mode, etc. When operating in a continuous cooling mode and/or a start-stop cooling mode, the transport climate control system 135 can operate in a pulldown setting and in a steady-state setting. The pulldown setting generally occurs when, for example, the climate controlled space 132 is being cooled from an ambient temperature down to a desired set-point temperature so that the transport climate control system 135 can bring the temperature down to the desired set-point temperature as quickly as possible. The steady-state setting generally occurs when, for example, the climate in the climate controlled space 132 has already reached or is close to approaching a desired set-point temperature and the transport climate control system 135 is working to maintain the desired set-point temperature.

The climate controller 145 may comprise a single integrated control unit or may comprise a distributed network of climate controller elements (not shown). The number of distributed control elements in a given network can depend upon the particular application of the principles described herein. The climate controller 145 is configured to control operation of the climate control system 135 including the transport climate control circuit.

The climate control system 135 is powered by a power system (see, for example, FIG. 2) that can distribute power to the climate control system 135 when a utility power source is unavailable. In some embodiments, the power system can be a generator set (not shown) attached to the van 130 and electrically connected to one or more components of the climate control system 135 (e.g., a compressor, one or more fans and/or blowers, the climate controller 145, one or more sensors, etc.). Operation of a power system is discussed in further detail below with respect to FIGS. 2 and 3.

FIG. 1E is a perspective view of a passenger vehicle 150 including a transport climate control system 155, according to one embodiment. In the embodiment illustrated in FIG. 1E, the passenger vehicle 150 is a mass-transit bus that can carry passenger(s) (not shown) to one or more destinations. In other embodiments, the passenger vehicle 150 can be a school bus, railway vehicle, subway car, or other commercial vehicle that carries passengers. Hereinafter, the term "vehicle" shall be used to represent all such passenger vehicles, and should not be construed to limit the scope of the application solely to mass-transit buses. The transport climate control system 155 can provide climate control within a climate controlled space which in this embodiment is a passenger compartment 154.

The passenger vehicle 150 includes a frame 152, a passenger compartment 154 supported by the frame 152, wheels 153, and a compartment 156. The frame 152 includes doors 158 that are positioned on a side of the passenger vehicle 150. A first door 158a is located adjacent to a forward end of the passenger vehicle 150, and a second door 158b is positioned on the frame 152 toward a rearward end of the passenger vehicle 150. Each door 158 is movable between an open position and a closed position to selectively allow access to the passenger compartment 154.

The transport climate control system 155 includes a climate control unit (CCU) 160 that is mounted to a rooftop 151 of the passenger vehicle 150. In an embodiment, the CCU 160 can be a HVAC unit. The climate control system 155 also includes a programmable climate controller 165 and one or more sensors (not shown) that are configured to measure one or more parameters of the transport climate control system 155 (e.g., an ambient temperature outside of the passenger vehicle 150, a space temperature within the passenger compartment 154, an ambient humidity outside of the passenger vehicle 150, a space humidity within the passenger compartment 154, etc.) and communicate parameter data to the climate controller 165.

The transport climate control system 155 can include, among other components, a transport climate control circuit (not shown) that connects, for example, a compressor, a condenser, an evaporator, and an expander (e.g., an expansion valve) to provide climate control within the passenger compartment 154.

The transport climate control system 155 can operate in multiple operation modes including, for example, a continuous cooling mode, a start/stop cooling mode, a heating mode, a defrost mode, a null mode, etc. When operating in a continuous cooling mode and/or a start-stop cooling mode, the transport climate control system 155 can operate in a pulldown setting and in a steady-state setting. The pulldown setting generally occurs when, for example, the passenger compartment 154 is being cooled from an ambient temperature down to a desired set-point temperature so that the transport climate control system 155 can bring the temperature down to the desired set-point temperature as quickly as possible. The steady-state setting generally occurs when, for example, the climate in the passenger compartment 154 has already reached or is close to approaching a desired set-point temperature and the transport climate control system 155 is working to maintain the desired set-point temperature.

The climate controller 165 may comprise a single integrated control unit or may comprise a distributed network of climate controller elements (not shown). The number of distributed control elements in a given network can depend upon the particular application of the principles described herein. The climate controller 165 is configured to control operation of the climate control system 155 including the transport climate control circuit.

The climate control system 135 is powered by a power system (see, for example, FIG. 2) that can distribute power to the climate control system 135 when a utility power source is unavailable. In some embodiments, the power system can be a generator set (not shown) attached to the passenger vehicle 150 and electrically connected to one or more components of the climate control system 155 (e.g., a compressor, one or more fans and/or blowers, the climate controller 165, one or more sensors, etc.). Operation of a power system is discussed in further detail below with respect to FIGS. 2 and 3.

The compartment 156 is located adjacent the rear end of the passenger vehicle 150, can include the power system. In some embodiments, the compartment 156 can be located at other locations on the vehicle 150 (e.g., adjacent the forward end, etc.).

It will be appreciated that the transport climate control systems described above with respect to FIGS. 1A-1E can operate in multiple operation modes including, for example, a continuous cooling mode, a start/stop cooling mode (also referred to as a cycle-sentry cooling mode), a heating mode, a defrost mode, a null mode, etc.

Of particular note, in the continuous cooling mode, a transport climate control system controller is configured to instruct a compressor to continuously compress the working fluid until the temperature within the climate controlled space reaches a desired setpoint temperature. In the start-stop cooling mode, the transport climate control system controller is configured to instruct the compressor to operate in a periodic cycle in which during each cycle the compressor is configured to compress the working fluid for a first period of time and then the compressor is configured to stop compressing the working fluid for a second period of time. The compressor will continue to cycle between compressing the working fluid and not compressing the working fluid until the temperature within the climate controlled space reaches the desired setpoint temperature. In some embodiments, the compressor is configured to compress the working fluid and direct the compressed working fluid from the compressor to the condenser during the start portion and inactivated (e.g., shut off, powered off, turned off, etc.) and/or configured to not compress working fluid during the stop portion. In some embodiments, during the stop portion of the start-stop cooling mode, fan(s) of the condenser and the evaporator are inactivated (e.g., shut off, powered off, turned off, etc.) and are not operating.

It will be appreciated that the period of time that the transport climate control system is operating in the stop portion of the start-stop cooling mode can be significantly longer that the period of time that the transport climate control system is operating in the start portion of the start-stop cooling mode, particularly when the transport climate control system is working to provide a frozen temperature range (e.g., well below 32° F. such as, for example, between approximately −10° F. to −40° F.) within the climate controlled space. By supplying power to the transport climate control system via the battery source instead of the prime mover during the stop portion, the detrimental effects of low EGT can be significantly reduced.

Figure 2:
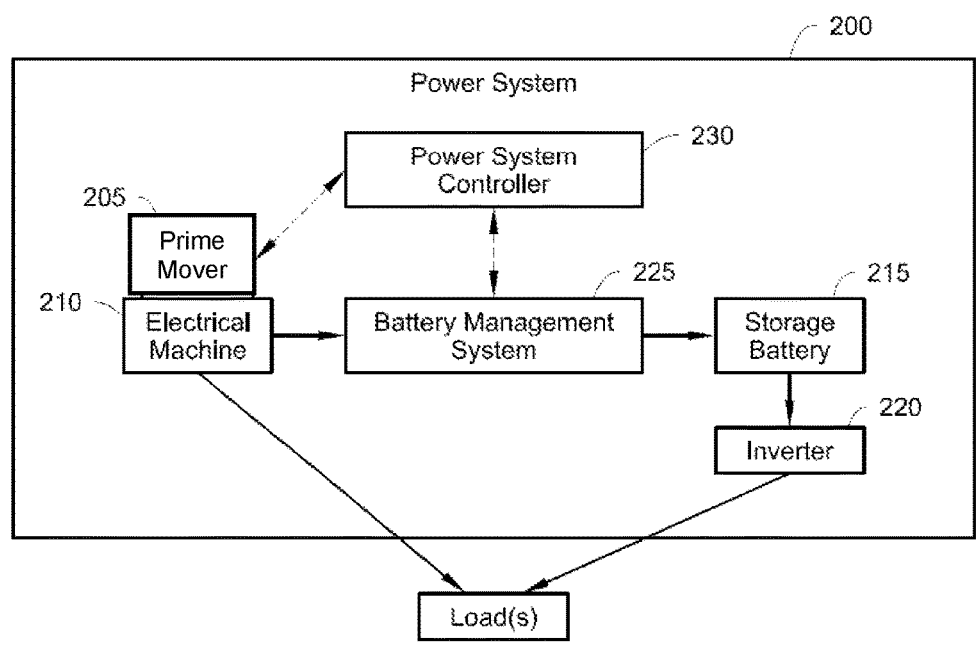
FIG. 2 is a schematic diagram of a power system, according to one embodiment.

FIG. 2 is a schematic diagram of a power system 200, according to one embodiment. In some embodiments, the power system 200 can be a generator set used to power a transport climate control system (e.g. the transport climate systems 15, 100, 124, 135 and 155 shown in FIGS. 1A-E).

The power system 200 includes a prime mover 205 (e.g., an engine such as a diesel engine), an electrical machine 210, a battery source 215, an inverter 220, a battery management system 225 and a power system controller 230.

The prime mover 205 can be an engine (e.g., a diesel engine) configured to provide mechanical power to the electrical machine 210. In some embodiments, the prime mover 205 can be a mechanical fuel injected engine. In some embodiments, the prime mover 205 can be a common rail fuel injection engine. In some embodiments, the prime mover 205 can include and be controlled by an engine control unit (ECU) (not shown). The ECU can be configured to regulate the amount of fuel delivered to the prime mover 205 and can be configured to operate the prime mover 205 at least at a first non-zero speed and a second non-zero speed. The ECU can be configured so that the prime mover 205 can be maintained at either the first non-zero speed or the second non-zero speed in a range of power demand load(s) on the prime mover 205. In some embodiments, the first non-zero speed can be about 1800 revolutions per minute (RPM) and the second non-zero speed can be about 15000 RPM. In other embodiments, where the prime mover 205 is a variable speed prime mover, the ECU can be configured so that the prime mover 205 can operate at multiple speeds between the first non-zero speed and the second non-zero speed. For example, in some embodiments the prime mover 205 can operate at multiple speeds between about 800 RPM and 2600 RPM. In some embodiments, the ECU can be coupled with the power system controller 230.

The electrical machine 210 can be a generator configured to convert mechanical power from the prime mover 205 into electrical power that can be used to power one or more loads and/or charge the battery source 215. When the electrical machine 210 is a generator, the electrical machine 210 can be coupled to the prime mover 205 by a flex disk (not shown) that transfers mechanical energy from the prime mover 205 to the electrical machine 210. In some embodiments, the electrical machine 210 can also be coupled to the prime mover 205 indirectly by a driving belt. The electrical machine 210 can include a power receptacle (not shown) that is in electrical communication with one or more loads such as, for example, a transport climate control system (such as the transport climate control systems shown in FIGS. 1A-1E) via a power cable (not shown) to provide electrical power to the transport climate control system.

In some embodiments, the electrical machine 210 can be a three phase alternating current (AC) generator that converts the mechanical power from the prime mover 205 into three phase AC electrical power. The electrical machine 210 can include, for example, a rotor (not shown), a stator (not shown), and a voltage regulator (not shown). The rotor can be coupled to the flex disk such that the prime mover 205 is operable to rotatably drive the rotor at least at the first non-zero speed and the second non-zero speed. The stator can be a stationary component of the electrical machine 210 that includes magnetic pole pairs (e.g., two pole pairs). The voltage regulator can include a field voltage and a field current that are generated by a regulation element (not shown) coupled to the voltage regulator. In some embodiments, the regulation element may include batteries or other solid-state components that generate a direct current through the voltage regulator. The field voltage and the field current can define a field excitation. The field excitation of the electrical machine 210 can be generally considered a field of the electrical machine 210. The field can be one part of the rotor and the stator.

Rotation of the rotor through the magnetic field can induce an output current from the electrical machine 210. The induced output current can produce an output voltage of the electrical machine 210 that is directed through the power receptacle to the load(s). It is to be noted that other types of electrical machines can be used in place of a generator. The electrical machine 210 as described above is exemplary only.

In some embodiments, the electrical machine 210 can further include an output frequency that can be affected by the speed of the prime mover 205 or the field voltage of the electrical machine 210. For example, the electrical machine 210 can provide a first output frequency (e.g., ~60 Hertz) when the prime mover 205 is operated at the first non-zero speed, and can provide a second output frequency (e.g., ~50 Hertz) when the prime mover 205 is operated at the second non-zero speed. It will be appreciated that in some embodiments the load(s) can be operated at both frequencies. In other embodiments, the electrical machine 210 can operate only at a single output frequency. In some embodiments, the prime mover 205 can be a variable speed prime mover that is capable of operating at multiple speeds between the first non-zero speed and the second non-zero speed.

The output voltage of the electrical machine 210 may be affected by the output frequency. As such, the electrical machine 210 can provide a first output voltage in response to operation of the electrical machine 210 at the first frequency. The electrical machine 210 can provide a second output voltage in response to operation of the electrical machine 210 at the second frequency. For example, when the electrical machine 210 is operated at the first non-zero speed/frequency (e.g., ~1800 RPM/60 Hertz), the first output voltage can be about 460 volts alternating current (VAC). When the electrical machine 210 is operated at the second non-zero speed/frequency (e.g., ~1500 RPM/50 Hertz), the second output voltage can be about 380 VAC. Thus, the speed of the prime mover 205 can affect the frequency and output voltage of the electrical machine 210.

The electrical machine 210 can be configured to supply a relatively constant load capacity that is sufficient to provide power to the load(s) under various conditions. A load on the electrical machine 210 can correspond to, for example, the climate control demand on a transport climate control system (e.g., electrical power needed by the transport climate control system), and can be variable in response to changes in the climate control demand on the transport climate control system.

The battery source 215 can include one or more batteries configured to provide DC power to the inverter 220. In some embodiments, the battery source 215 can be one or more battery packs, a rechargeable energy storage system (RESS), etc. In some embodiments, the battery source 215 can include a small battery source (e.g., an approximately 2 kilowatt-hour (kW-hr) battery source). In some embodiments, the battery source 215 can include a large battery source (e.g., an approximately 40 kW-hr battery source). In some embodiments, the battery source 215 can include both a small battery source and a large battery source.

The inverter 220 is configured to convert DC power from the battery source 215 into three phase AC power. It will be appreciated that the power outputted by the inverter can depend on design specifications of the power system 200.

The battery management system 225 is configured to use three phase AC power generated by the electrical machine 210 to charge the battery source 215. In some embodiments, the battery management system 225 is configured to convert three phase AC power from the electrical machine 210 into single phase direct current (DC) power for charging the battery source 215. The battery management system 225 can also be configured to perform AC and DC power inversion, monitor the battery source 215, provide data regarding the state of the battery/batteries of the battery source 215 to be used in control logic functionality (e.g., determining capacity range of the battery source 215, determine a recharge voltage capacity trigger value based on a battery capacity decay rate of the battery/batteries of the battery source 215, perform safety functionality to prevent run-away thermal/chemical/self-destruction condition(s), and filter power). The battery management system 225 can include, for example one or more power inverters, a thermal management system, one or more power filters, etc. In some embodiments, the battery management system 225 can monitor power demand from the load(s), for example, when the prime mover 205 is shut off and communicate the power demand to the power system controller 225

The power system controller 230 is configured to control operation of the power system 200. When the prime mover 205 includes an ECU, the power system controller 230 can be coupled to the ECU via, for example, a communication area network (e.g., a J1939 CAN). The power system controller 230 can receive information from the ECU and can command the ECU to vary the prime mover 205 between different speeds (e.g., between a first non-zero speed and a second non-zero speed). In some embodiments, the power system controller 230 can receive sensor data from one or more sensors (not shown) of the power system 200 that can be used to monitor the power demand from the load(s). In one example, the power system controller 230 can receive sensor data that can be used to monitor a percent prime mover load (PM % LOD) indicating, for the current speed of the prime mover 205, the amount of air/fuel delivery going through the prime mover 205 relative to the amount of air/fuel delivery going to the prime mover 205 at a wide-open throttle (e.g., the prime mover operating at peak torque). That is, the percent prime mover load can indicate a percentage of peak available torque of the prime mover 205. In some embodiments, the power system controller 230 can also communicate with the battery management system 225. In particular, the power system controller 230 can communicate with the battery management system 225 to determine whether the battery source 215 has sufficient energy (e.g., charge) to power the load(s). Also, the power system controller 230 can communicate with the battery management system 225 to instruct the battery management system 225 to demand power from the electrical machine 210 in order to charge the battery source 215.

Also, the power system controller 230 can distribute power demand between supplying power from prime mover 205 and supplying power from the battery source 215. In some embodiments, the power system controller 230 can monitor power demand from load(s) powered by the power system 200 and determine which of the prime mover 205 and the battery source 215 supplies power to the load(s) based on the monitored power demand. In some embodiments, the power system controller 230 can receive sensor data from one or more sensors (not shown) of the power system 200. For example, in one embodiment, the power system controller 230 can receive sensor data that can be used to monitor percent prime mover load (PM % LOD) indicating, for the current speed of the prime mover 205, the amount of air/fuel delivery going through the prime mover 205 relative to the amount of air/fuel delivery going to the prime mover 205 at a wide-open throttle (e.g., the prime mover operating at peak torque). That is, the percent prime mover load can indicate a percentage of peak available torque of the prime mover 205. In some embodiments, the power system controller 230 can receive sensor data (e.g., acceleration of prime mover RPM, injected fuel quantity, etc.) from an ECU of the prime mover 205. In other examples, the power system controller 230 can monitor power demand based on, for example, an operation mode of the transport climate control system, ambient conditions (e.g., ambient air temperature, solar load, wind, etc.), vehicle speed (e.g., indicating forced convection over a climate controlled transport unit surface), respiration data of cargo (e.g., fresh produce) within the climate controlled space, an estimated loss/leak rate within the climate controlled space, state of the battery source 215, etc. In some embodiments, the power system controller 230 can receive sensor data monitoring, for example, a compressor speed, a discharge and suction pressure of the compressor, etc. in order to calculate the amount of power drawn by the compressor. In some embodiments, the power system controller 230 can monitor power demand from the load(s) by adding, for example, an amount of power drawn by the compressor with the amount of power drawn by one or more condenser fan(s) and one or more evaporator blower(s). Operation of the power system controller 230 is described in more detail below with respect to FIG. 3.

It will be appreciated that in some embodiments, the power system 200 (e.g., a generator set) and particularly the power system controller 230 may not be able to directly communicate with the load(s) (e.g., a transport climate control system). Accordingly, the power system 200 may be required to continuously provide power to the load(s) even when the load(s) may be operating in a null setting (e.g., operating in a stop portion of a start-stop cooling mode). However, by monitoring power demand from the load(s), the power system controller 230 can infer how the transport climate control system is operating.

It will be appreciated that the prime mover 205 can be most efficient when operating at a wide-open throttle (e.g., peak torque). However, in many situations, the load(s) demanding power from the power system 200 are not demanding power at a level for the prime mover 205 to operate with a wide-open throttle and the load(s) may not be in communication with the power system 200. An advantage of the power system 200 including both a prime mover 205 and a battery source 215 is that the prime mover 205 is not required to operate when load(s) demanding power from the power system 200 is low (e.g., less than 20% prime mover load) or not demanding power at all. That is, the power system controller 230 can instruct the battery source 215 to supply power to the load(s) and can instruct the prime mover 205 to inactivate (e.g., shut off, power off, turn off, etc.) when the power demanded by the load(s) is less than a certain threshold (e.g., less than 20% prime mover load).

Figure 3:
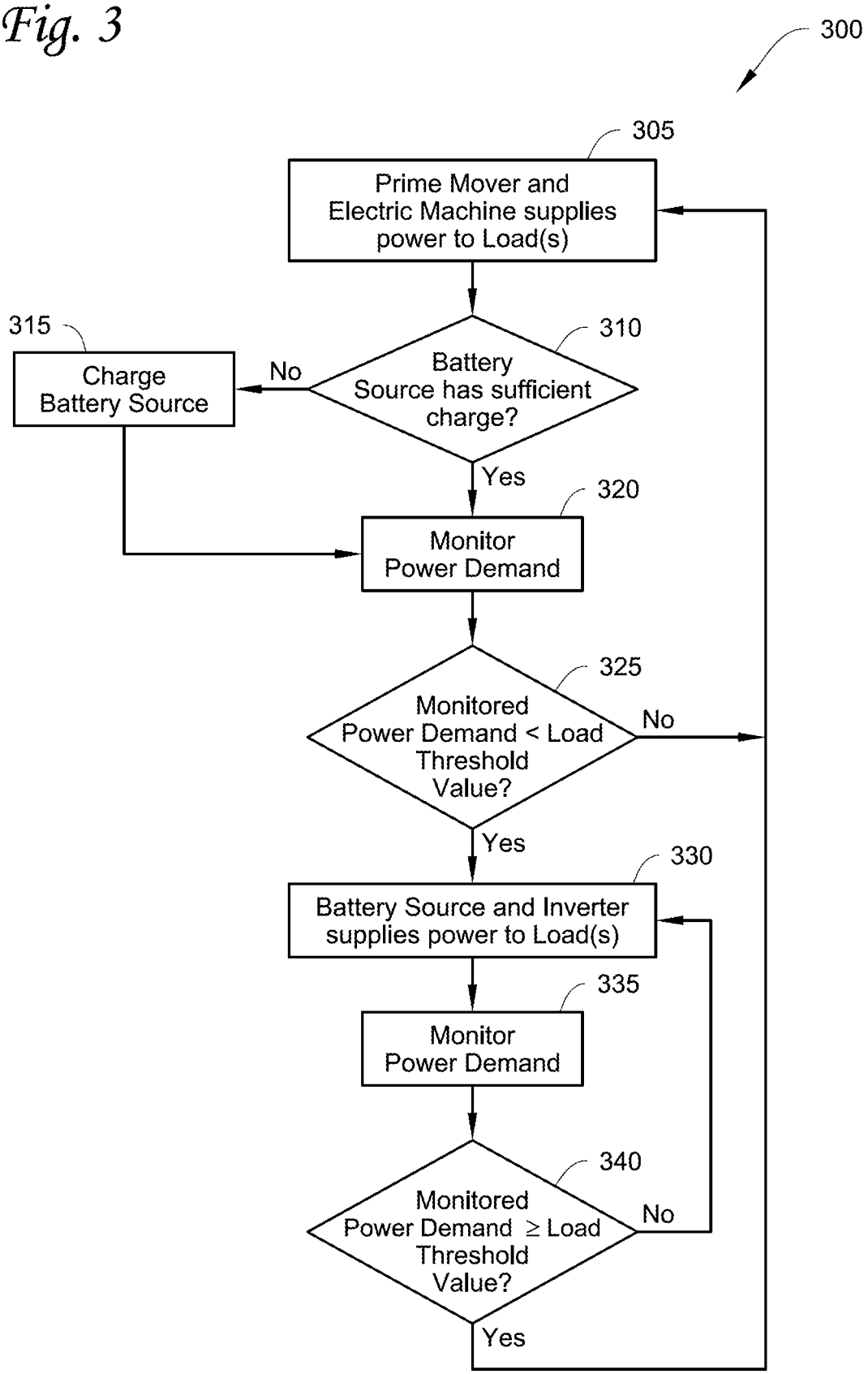
FIG. 3 illustrates a flow chart of a method for controlling the power system of FIG. 2, according to one embodiment.

FIG. 3 illustrates a flow chart of a method 300 for controlling the power system 200, according to one embodiment. The method 300 begins at 305 whereby the prime mover 200 combined with the electrical machine 210 are supplying power (e.g., AC power) to the load(s) and the battery source 215 with the inverter 220 are not supplying power to the load(s). The method then proceeds to 310.

At 310, the power system controller 230 communicates with the battery management system 225 to determine whether the battery source 215 has sufficient energy (e.g., state of charge (SOC)) to power the load(s). In some embodiments, the power system controller 230 can determine whether the battery source 215 has sufficient energy when, for example, the battery source 215 has sufficient charge/capacity (e.g., 0.2 kW-hr to 1 kW-hr) to restart the prime mover 205 for recharging the battery source 215. In some embodiments, the power system controller 230 can determine whether the battery source 215 has sufficient energy based on whether the SOC is greater than a SOC threshold. In some embodiments, the SOC threshold can be, for example, 20%. It will be appreciated that the SOC threshold can be based on a battery manufacturer recommendation. When the power system controller 230 determines that the battery source 215 does not have sufficient energy to power the load(s), the method 300 proceeds to 315. When the power system controller 230 determines that the battery source 215 has sufficient energy to power the load(s), the method 300 proceeds to 320.

At 315, the power system controller 230 instructs the battery management system 225 to demand power from the electrical machine 210 in order to charge the battery source 215. The method 300 then proceeds to 320.

At 320, the power system controller 230 monitors a power demand from load(s) being powered by the power system 200. In some embodiments, the power system controller 230 is configured to receive sensor data from one or more sensors of the power system 200 that can be used to monitor the power demand from the load(s). In one example, the power system controller 230 can receive sensor data that can be used to monitor a percent prime mover load (PM % LOD) indicating, for the current speed of the prime mover, the amount of air/fuel delivery going through the prime mover relative to the amount of air/fuel delivery going to the prime mover at a wide-open throttle (e.g., the prime mover operating at peak torque). That is, the percent prime mover load can indicate a percentage of peak available torque of the prime mover 205. In some embodiments, the power system controller 230 can receive sensor data (e.g., acceleration of prime mover RPM, injected fuel quantity, etc.) from an ECU of the prime mover 205. In other examples, the power system controller 230 can monitor power demand based on, for example, an operation mode of the transport climate control system, ambient conditions (e.g., ambient air temperature, solar load, wind, etc.), vehicle speed (e.g., indicating forced convection over a climate controlled transport unit surface), respiration data of cargo (e.g., fresh produce) within the climate controlled space, an estimated loss/leak rate within the climate controlled space, state of the battery source 215, etc. In some embodiments, the power system controller 230 can monitor power demand from the load(s) by adding, for example, an amount of power drawn by a compressor with the amount of power drawn by one or more condenser fan(s) and one or more evaporator blower(s). The method 300 then proceeds to 325.

At 325, the power system controller 230 is configured to determine whether the power demand monitored at 320 has dropped below a load threshold value. When the power system controller 230 determines that the monitored power demand has dropped below the load threshold value, the method 300 proceeds to 330. When the power system controller 230 determines that the monitored power demand has not dropped below the load threshold value, the method 300 proceeds back to 305. In some embodiments, when the power system controller 230 is monitoring the percent prime mover load, the load threshold value can be a percent prime mover load threshold. For example, in some embodiments, the percent prime mover load threshold can be 20%. In this example, when the power system controller 230 determines that the monitored percent prime mover load has dropped below 20%, the method proceeds to 330. When the power system controller 230 determines that the monitored percent prime mover load has not dropped below 20%, the method proceeds back to 305.

In some embodiments, when the load(s) are from a transport climate control system, the power system controller 230 can determine that the monitored power demand has dropped below the load threshold value when the transport climate control system is operating in a stop portion of a start-stop cooling mode whereby a compressor of the transport climate control system is inactivated (e.g., shut off, powered off, turned off, etc.) or otherwise configured to not compress a working fluid (e.g., refrigerant). In some embodiments, the power system controller 230 can determine that the monitored power demand has not dropped below the load threshold value when the transport climate control system is operating in a start portion of a start-stop cooling mode whereby a compressor of the transport climate control system is on.

At 330, the power system controller 230 instructs the prime mover 205 to inactivate (e.g., shut off, power off, turn off, etc.) and instructs the battery source 215 with the inverter 220 to supply power (e.g., AC power) to the load(s). The method 300 then proceeds to 335.

At 335, the power system controller monitors the power demand from the load(s) being powered by the power system 200. In some embodiments, the power system controller 230 is configured to receive sensor data from one or more sensors of the power system 200 that can be used to monitor the power demand from the load(s). In some embodiments, the battery management system 225 can monitor power demand from the load(s), for example, when the prime mover 205 is shut off and communicate the power demand to the power system controller 225. The method 300 then proceeds to 340.

At 340, the power system controller 230 determines whether the power demand monitored at 335 has reached or increased above a load threshold value. The load threshold value can be a preset value based on the amount of battery capacity of the battery source 215 to be able to restart the prime mover 205. In some embodiments, the load threshold value can be based on, for example, the battery capacity of the battery source 215, the amount of power required by the prime mover starter, and an output of the prime mover 205. In some embodiments, the load threshold value can be, for example, between 1% to 5% of the total charge capacity of the battery source 215. When the power system controller 230 determines that the monitored power demand has reached or increased above the load threshold value, the method 300 proceeds back to 305. When the power system controller 230 determines that the monitored power demand has not reached or increased above the load threshold value, the method 300 proceeds back to 330.

Figure 4:
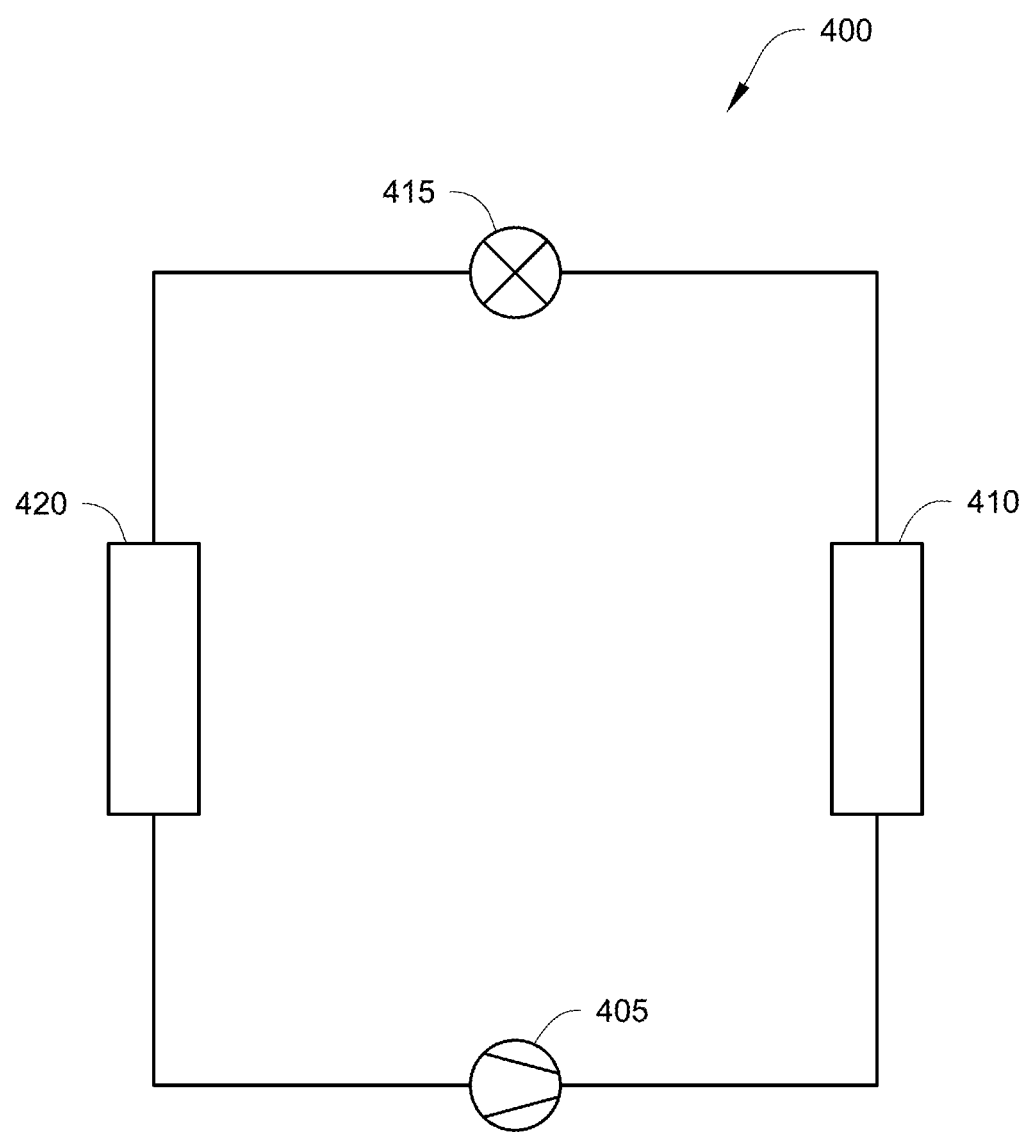
FIG. 4 is a schematic diagram of a climate control circuit, according to one embodiment.

FIG. 4 is a schematic diagram of a climate control circuit 400, according to one embodiment. The climate control circuit 400 generally includes a compressor 405, a condenser 410, an expander 415 (e.g., an expansion valve or the like), and an evaporator 420. The climate control circuit 400 is exemplary and can be modified to include additional components. For example, in some embodiments the climate control circuit 400 can include an economizer heat exchanger, one or more flow control devices (e.g., valves or the like), a receiver tank, a dryer, a suction-liquid heat exchanger, or the like.

The climate control circuit 400 can generally be applied in a variety of systems used to control an environmental condition (e.g., temperature, humidity, air quality, or the like) in a space (generally referred to as a climate controlled space). Examples of systems include, but are not limited to the transport climate control systems shown and described above in accordance with FIGS. 1A-1E.

The components of the climate control circuit 400 are fluidly connected. The climate control circuit 400 can be specifically configured to be a cooling system (e.g., an air conditioning system) capable of operating in a cooling mode. Alternatively, the climate control circuit 400 can be specifically configured to be a heat pump system which can operate in both a cooling mode and a heating/defrost mode. In other embodiments, the climate control circuit 400 can include one or more resistance type heater bars as a heat source option.

The climate control circuit 400 operates according to generally known principles. The climate control circuit 400 can be configured to heat or cool heat transfer fluid or medium (e.g., a gas such as, but not limited to, air or the like), in which case the climate control circuit 400 may be generally representative of an air conditioner or heat pump.

The compressor 405 can be, for example, a scroll compressor, a reciprocal compressor, or the like. In some embodiments, the compressor 405 can be a mechanically driven compressor. In other embodiments, the compressor 405 can be an electrically driven compressor. The compressor 405 is configured to compress a working fluid (e.g., refrigerant) and direct the working fluid through the climate control circuit 400 in order to provide temperature control within a climate controlled space (e.g., the climate controlled spaces shown in FIGS. 1A-1E). In particular, the compressor 405 is configured to direct the compressed working fluid that is a gas to the condenser 410.

The condenser 410 can include a condenser coil (not shown) and one or more condenser fans. The condenser 410 is configured to allow the working fluid, received from the compressor 405, to transform from a gas to a liquid by releasing heat absorbed by the working fluid into the ambient environment outside of the climate controlled space. That is, the condenser 410 is configured to cool and condense the working fluid. The condenser 410 is configured to direct the liquid working fluid to the expander 415.

The expander 415 is configured to receive the working fluid in the form of a liquid from the condenser 410 and is configured to restrict the flow of the working fluid in the form of a gas to the evaporator 420. In some embodiments, the expander 415 can be an expansion valve. The gaseous working fluid is directed by the expander 415 to the evaporator 420.

The evaporator 420 can include an evaporator coil (not shown) and one or more evaporator fans. The evaporator 420 is configured to allow the working fluid, received from the expander 415, to evaporate from a liquid to a gas by absorbing heat from the climate controlled space and thereby provide cooling to the climate controlled space.

A controller (e.g., the climate controllers shown in FIGS. 1A-1E) is configured to control the climate control circuit 200 to operate in a plurality of different operation modes including, for example, a continuous cooling mode, a start-stop cooling mode, a heating mode, etc.

Of particular note, in the continuous cooling mode, the controller is configured to instruct the compressor 405 to continuously compress the working fluid until the temperature within the climate controlled space reaches a desired setpoint temperature. In the start-stop cooling mode, the controller is configured to instruct the compressor 405 to operate in a periodic cycle in which during each cycle the compressor 405 is configured to compress the working fluid for a first period of time (e.g., during a start portion of the start-stop cooling mode) and then the compressor 405 is configured to stop compressing the working fluid for a second period of time (e.g., during a stop portion of the start-stop cooling mode). The compressor 405 will continue to cycle between compressing the working fluid and not compressing the working fluid until the temperature within the climate controlled space reaches the desired setpoint temperature. In some embodiments, the compressor 405 is configured to compress the working fluid and direct the compressed working fluid from the compressor 405 to the condenser 410 during the start portion and configured to inactivate (e.g., shut off, power off, turn off, etc.) and/or not compress working fluid during the stop portion. In some embodiments, during the stop portion of the start-stop cooling mode fan(s) of the condenser 410 and the evaporator 420 are inactivated (e.g., shut off, powered off, turned off, etc.) and are not operating.

When operating in the continuous cooling mode and/or a start portion of the start-stop cooling mode, the compressor 405 compresses a working fluid (e.g., refrigerant or the like) from a relatively lower pressure gas to a relatively higher-pressure gas. The relatively higher-pressure and higher temperature gas is discharged from the compressor 405 and flows through the condenser 410. In accordance with generally known principles, the working fluid flows through the condenser 10 and rejects heat to a heat transfer fluid or medium (e.g., air, etc.), thereby cooling the working fluid. The cooled working fluid, which is now in a liquid form, flows to the expander 415. The expander 415 reduces the pressure of the working fluid. As a result, a portion of the working fluid is converted to a gaseous form. The working fluid, which is now in a mixed liquid and gaseous form flows to the evaporator 420. The working fluid flows through the evaporator 420 and absorbs heat from a heat transfer medium (e.g., air, etc.), heating the working fluid, and converting it to a gaseous form. The gaseous working fluid then returns to the compressor 405.

Aspects:

It is noted that any of aspects 1-7 can be combined with any one of aspects 8-15.

Aspect 1. A method for controlling a power system that powers a load, the power system including a prime mover, an electrical machine coupled to the prime mover, a battery source, an inverter coupled to the battery source, and a power system controller configured to control operation of the power system, the method comprising:
 monitoring a power demand on the power system from the load;
 comparing the monitored power demand with a load threshold value;
 determining that the monitored power demand is less than the load threshold value; and
 upon determining that the monitored power demand is less than the load threshold value: inactivating the prime mover, and instructing the battery source with the inverter to supply power to the load.

Aspect 2. The method of aspect 1, further comprising determining that the monitored power demand is not less than the load threshold value; and
 upon determining that the monitored power demand is not less than the load threshold value instructing the prime mover with the electrical machine to supply power to the load.

Aspect 3. The method of aspect 2, wherein, upon determining that the monitored power demand is not less than the load threshold value, the electrical machine sending power to the battery source for charging the battery source Aspect 4. The method of any one of aspects 1-3, wherein the power system is a generator set, the prime mover is a diesel engine configured to provide mechanical power to the electrical machine, and the electrical machine is a three phase alternating current (AC) generator that is configured to convert the mechanical power from the diesel engine into three phase AC electrical power.

Aspect 5. The method of any one of aspects 1-4, wherein the load is a transport climate control system that includes a compressor configured to compress a working fluid.

Aspect 6. The method of any one of aspects 1-5, wherein monitoring the power demand on the power system from the load includes monitoring a percent prime mover load indicating a percentage of peak available torque of the prime mover, and
 wherein comparing the monitored power demand with a load threshold value includes comparing the monitored percent prime mover load to a percent prime mover load threshold.

Aspect 7. The method of aspect 6, wherein the percent prime mover load threshold is twenty percent.

Aspect 8. A power system for supplying power to a load, the power system comprising:
 a prime mover configured to generate mechanical power;
 an electrical machine coupled to the prime mover, wherein the electrical machine is configured to convert the mechanical power from the prime mover into a first electrical power for powering the load;
a battery source configured to supply a second electrical power to the inverter;
an inverter coupled to the battery source, wherein the inverter is configured to convert the second electrical power from the battery source into the first electrical power that is supplied to the load; and
a power system controller configured to control operation of the power system, wherein the power system controller is configured to:
monitor a power demand on the power system from the load,
compare the monitored power demand with a load threshold value,
determine whether the monitored power demand is less than the load threshold value, and
upon determination that the monitored power demand is less than the load threshold value:
inactivate the prime mover, and
instruct the battery source with the inverter to supply the first electrical power to the load.

Aspect 9. The power system of aspect 8, wherein the power system controller is configured to, upon determination that the monitored power demand is not less than the load threshold value, instruct the prime mover with the electrical machine to supply the first electrical power to the load.

Aspect 10. The power system of any one of aspects 8 and 9, further comprising a battery management system configured to convert the first electrical power into the second electrical power,
wherein the power system controller is configured to, upon determination that the monitored power demand is not less than the load threshold value:
instruct the electrical machine to send the first electrical power to the battery management system,
instruct the battery management system to convert the first electrical power into the second electrical power, and
instruct the battery management system to send the second electrical power to the battery source for charging the battery source.

Aspect 11. The power system of any one of aspects 8-10, wherein the power system is a generator set, the prime mover is a diesel engine configured to provide mechanical power to the electrical machine, and the electrical machine is a generator that is configured to convert the mechanical power from the diesel engine into the first electrical power.

Aspect 12. The power system of any one of aspects 8-11, wherein the load is a transport climate control system that includes a compressor configured to compress a working fluid.

Aspect 13. The power system of any one of aspects 8-12, wherein the power system controller being configured to monitor the power demand on the power system from the load includes the power system controller being configured to monitor a percent prime mover load indicating a percentage of peak available torque of the prime mover, and
wherein the power system controller being configured to compare the monitored power demand with a load threshold value includes the power system controller being configured to compare the monitored percent prime mover load to a percent prime mover load threshold.

Aspect 14. The power system of aspect 13, wherein the percent prime mover load threshold is twenty percent.

Aspect 15. The power system of any one of aspects 8-14, wherein the first electrical power is a three phase alternating current (AC) electrical power and the second electrical power is a single phase direct current (DC) electrical power.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method for controlling a power system that powers a load, the power system including a prime mover, an electrical machine coupled to the prime mover and configured to convert mechanical power from the prime mover into a first electrical power for powering the load, a battery source, an inverter coupled to the battery source, and a power system controller configured to control operation of the power system, the method comprising:
monitoring a power demand on the power system from the load;
comparing the monitored power demand with a load threshold value;
determining that the monitored power demand is less than the load threshold value;
upon determining that the monitored power demand is less than the load threshold value:
deactivating the prime mover, and
instructing the battery source with the inverter to supply the first electrical power to the load, including the battery source supplying a second electrical power to the inverter and the inverter converting the second electrical power from the battery source into the first electrical power;
determining that the monitored power demand is not less than the load threshold value; and
upon determining that the monitored power demand is not less than the load threshold value, the electrical machine sending power to the battery source for charging the battery source.

2. The method of claim 1, upon determining that the monitored power demand is not less than the load threshold value instructing the prime mover with the electrical machine to supply the first electrical power to the load.

3. The method of claim 1, wherein the power system is a generator set, the prime mover is a diesel engine configured to provide mechanical power to the electrical machine, and the electrical machine is a three phase alternating current (AC) generator that is configured to convert the mechanical power from the diesel engine into three phase AC electrical power.

4. The method of claim 1, wherein the load is a transport climate control system that includes a compressor configured to compress a working fluid.

5. The method of claim 1, wherein monitoring the power demand on the power system from the load includes monitoring a percent prime mover load indicating a percentage of peak available torque of the prime mover, and
wherein comparing the monitored power demand with a load threshold value includes comparing the monitored percent prime mover load to a percent prime mover load threshold.

6. The method of claim 5, wherein the percent prime mover load threshold is twenty percent.

7. The method of claim 1, further comprising:
determining that the battery source does not have sufficient energy; and
upon determining that the battery source does not have sufficient energy, instructing a battery management system to demand power from the electrical machine for charging the battery source.

8. The method of claim 7, wherein determining that the battery source does not have sufficient energy includes determining that the battery source does not have sufficient energy to restart the prime mover.

9. The method of claim 1, wherein the first electrical power is a three phase alternating current (AC) electrical power and the second electrical power is a single phase direct current (DC) electrical power.

10. The method of claim 1, wherein the electrical machine sending power to the battery source for charging the battery source includes:
the electrical machine sending the first electrical power to a battery management system,
the battery management system converting the first electrical power into the second electrical power, and
the battery management system sending the second electrical power to the battery source for charging the battery source.

11. A power system for supplying power to a load, the power system comprising:
a prime mover configured to generate mechanical power;
an electrical machine coupled to the prime mover, wherein the electrical machine is configured to convert the mechanical power from the prime mover into a first electrical power for powering the load;
a battery source configured to supply a second electrical power to an inverter;
the inverter coupled to the battery source, wherein the inverter is configured to convert the second electrical power from the battery source into the first electrical power that is supplied to the load; and
a power system controller configured to control operation of the power system, wherein the power system controller is configured to:
monitor a power demand on the power system from the load,
compare the monitored power demand with a load threshold value,
determine whether the monitored power demand is less than the load threshold value,
upon determination that the monitored power demand is less than the load threshold value:
deactivate the prime mover, and
instruct the battery source with the inverter to supply the first electrical power to the load,
upon determination that the monitored power demand is not less than the load threshold value, instruct the electrical machine to send power to the battery source for charging the battery source.

12. The power system of claim 11, wherein the power system controller is configured to, upon determination that the monitored power demand is not less than the load threshold value, instruct the prime mover with the electrical machine to supply the first electrical power to the load.

13. The power system of claim 11, further comprising a battery management system configured to convert the first electrical power into the second electrical power,
wherein the power system controller is configured to, upon determination that the monitored power demand is not less than the load threshold value:
instruct the electrical machine to send the first electrical power to the battery management system,
instruct the battery management system to convert the first electrical power into the second electrical power, and
instruct the battery management system to send the second electrical power to the battery source for charging the battery source.

14. The power system of claim 11, wherein the power system is a generator set, the prime mover is a diesel engine configured to provide mechanical power to the electrical machine, and the electrical machine is a generator that is configured to convert the mechanical power from the diesel engine into the first electrical power.

15. The power system of claim 11, wherein the load is a transport climate control system that includes a compressor configured to compress a working fluid.

16. The power system of claim 11, wherein the power system controller being configured to monitor the power demand on the power system from the load includes the power system controller being configured to monitor a percent prime mover load indicating a percentage of peak available torque of the prime mover, and
wherein the power system controller being configured to compare the monitored power demand with a load threshold value includes the power system controller being configured to compare the monitored percent prime mover load to a percent prime mover load threshold.

17. The power system of claim 16, wherein the percent prime mover load threshold is twenty percent.

18. The power system of claim 11, wherein the first electrical power is a three phase alternating current (AC) electrical power and the second electrical power is a single phase direct current (DC) electrical power.

19. The power system of claim 11, further comprising a battery management system configured to convert the first electrical power into the second electrical power,
wherein the power system controller is configured to determine whether the battery source has sufficient energy,
wherein, upon the power system controller determining that the battery source does not have sufficient energy, the power system controller being configured to instruct the battery management system to demand power from the electrical machine to charge the battery source.

20. The power system of claim 19, wherein the power system controller is configured to determine whether the battery source has sufficient energy by determining whether the battery source has sufficient energy to restart the prime mover.

* * * * *